(12) United States Patent
Smith et al.

(10) Patent No.: US 9,733,845 B2
(45) Date of Patent: Aug. 15, 2017

(54) SHARED VIRTUALIZED LOCAL STORAGE

(71) Applicant: Cisco Technology, Inc., San Jose, CA (US)

(72) Inventors: James B. Smith, San Jose, CA (US); Sesidhar Baddela, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 385 days.

(21) Appl. No.: 14/499,514

(22) Filed: Sep. 29, 2014

(65) Prior Publication Data

US 2016/0092126 A1    Mar. 31, 2016

(51) Int. Cl.
*G06F 3/06* (2006.01)
*G06F 13/42* (2006.01)
*G06F 13/38* (2006.01)

(52) U.S. Cl.
CPC .......... *G06F 3/0619* (2013.01); *G06F 3/0607* (2013.01); *G06F 3/067* (2013.01); *G06F 3/0626* (2013.01); *G06F 3/0661* (2013.01); *G06F 3/0664* (2013.01); *G06F 3/0665* (2013.01); *G06F 3/0689* (2013.01); *G06F 13/4221* (2013.01); *G06F 13/387* (2013.01)

(58) Field of Classification Search
CPC .............................. G06F 13/387; G06F 3/0664
See application file for complete search history.

(56) References Cited

U.S. PATENT DOCUMENTS

| 6,789,152 | B2 | 9/2004 | Hoese et al. |
| 6,925,533 | B2 | 8/2005 | Lewis |
| 2003/0037184 | A1 * | 2/2003 | Day ............... G11B 27/002 710/1 |
| 2006/0206666 | A1 | 9/2006 | Lambert et al. |
| 2014/0173195 | A1 | 6/2014 | Rosset et al. |
| 2015/0319237 | A1 * | 11/2015 | Hussain .............. G06F 3/065 709/217 |

FOREIGN PATENT DOCUMENTS

| EP | 1324181 A2 | 7/2003 |
| WO | 9934297 A1 | 7/1999 |
| WO | 2012057769 A1 | 5/2012 |
| WO | 2013066482 A1 | 5/2013 |

OTHER PUBLICATIONS

International Search Report and Written Opinion in counterpart International Application No. PCT/US2015/051352, mailed Dec. 8, 2015, 11 pages.

* cited by examiner

*Primary Examiner* — Zachary K Huson
(74) *Attorney, Agent, or Firm* — Edell, Shapiro & Finnan, LLC

(57) ABSTRACT

An embedded processing unit (eCPU) processes an input/output (I/O) request from a host using a virtual storage controller. The eCPU associates a virtual network interface with a host. The virtual storage controller uses a first transport protocol. The eCPU receives an I/O request directed at a storage device from the virtual storage controller. The eCPU determines a second transport protocol used by the storage device, and converts the I/O request from a format according to the first transport protocol to a format according to the second transport protocol. The eCPU transmits the I/O request to the storage device using the second transport protocol.

24 Claims, 6 Drawing Sheets

SHARED VIRTUALIZED LOCAL STORAGE

TECHNICAL FIELD

The present disclosure relates to providing virtualized local storage to computing devices.

BACKGROUND

Servers, such as rack-mounted blade servers, typically have processors, memory, local storage, and network interfaces on board. The local storage disks can be a significant portion of the server's physical footprint, especially if multiple disks are required for a Redundant Array of Independent Disks (RAID) device. Network attached storage is expensive, increasing the per-server cost, and complicating configuration by a server administrator.

DESCRIPTION OF EXAMPLE EMBODIMENTS

Overview

Presented herein are an apparatus and methods for an embedded processor to process an I/O request from a host using a virtual storage controller. The embedded processor associates a first virtual storage controller with a first host. The first virtual storage controller uses a first transport protocol. The embedded processor receives a first I/O request directed at a storage device from the first virtual storage controller using the first network transport protocol. The embedded processor determines a second transport protocol used by the storage device, and converts the first I/O request from a format according to the first transport protocol to a format according to the second transport protocol. The embedded processor transmits the first I/O request to the storage device using the second transport protocol.

EXAMPLE EMBODIMENTS

The examples presented herein provide for presenting an interface between a server and a shared, virtualized storage system. In a specific example, a virtual interface card (VIC) is used to present a virtual Peripheral Component Interconnect Express (PCIe) Small Computer System Interface (SCSI) storage controller to the server on the PCIe bus. The VIC firmware interacts with the server operating system using standard input/output (I/O) mechanisms for SCSI devices. I/O requests issued to the virtual SCSI controller are steered to a portion of a shared drive that is reserved for the server.

Virtual PCIe storage controllers may be presented on the PCIe bus of multiple servers simultaneously. Each of the servers sees the portion of the shared drive(s) as its own private local drive, and issues I/O requests accordingly. The I/O requests are managed by the VIC firmware, and the I/O completions are delivered to the issuing server when the physical I/O is complete. Hereinafter, the terms "server" and "host" may be used interchangeably to describe an anonymous computing node with processors and memory that may not maintain a persistent state. The lack of a persistent state allows for simple replacement on failure or upgrading as processor technology improves.

Figure 1:
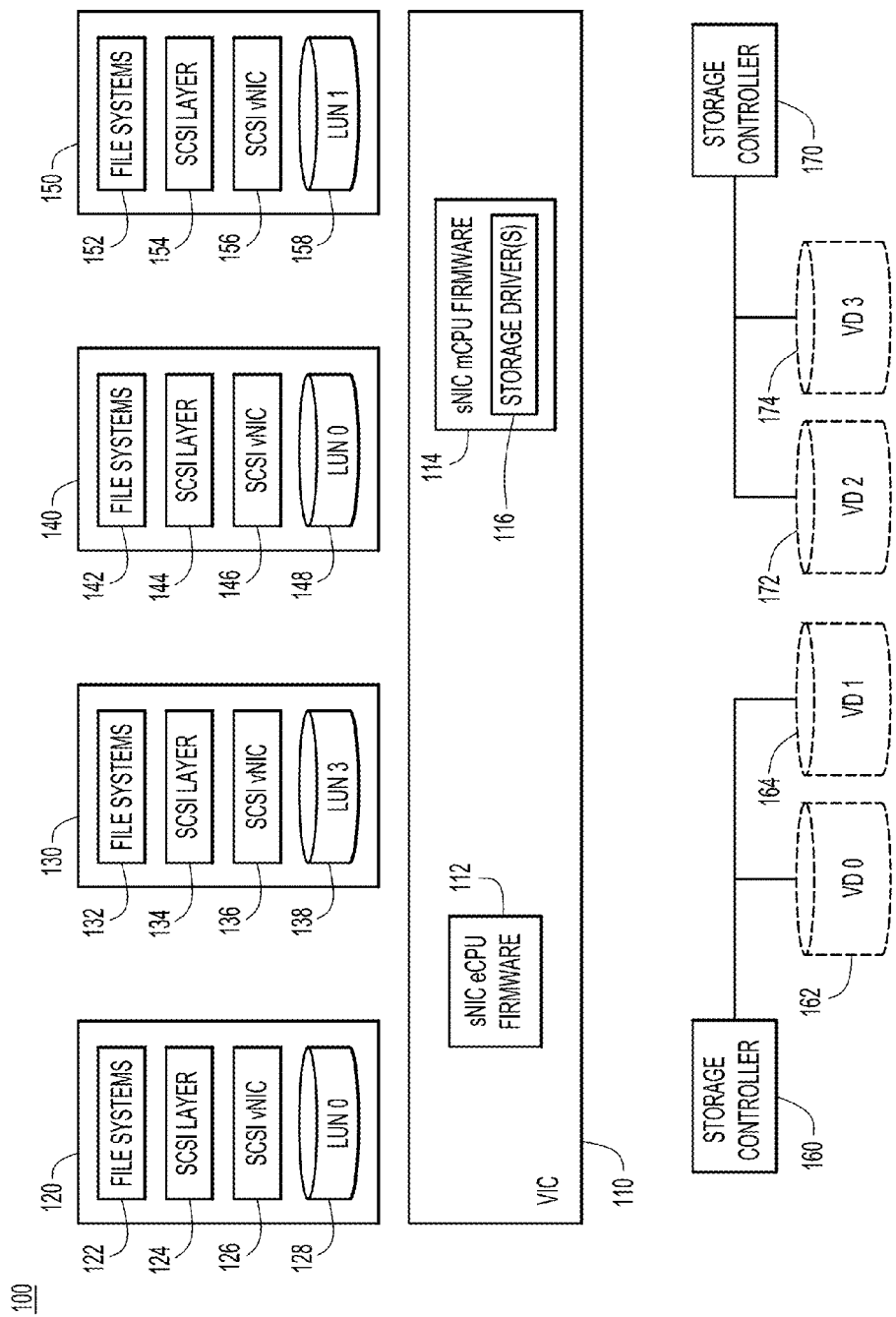
FIG. 1 is a block diagram of a system configured to provide a plurality of hosts with virtualized local access to data storage according to an example embodiment.

Referring to FIG. 1, a system 100 is shown comprising a plurality of hosts communicating with a plurality of storage devices through a VIC 110. VIC 110 includes one or more embedded central processing units (eCPUs) to process eCPU firmware 112 by sending and receiving I/O requests from hosts 120, 130, 140, and 150. One of the eCPUs may be designated as a management CPU (mCPU) to process mCPU firmware 114, which includes one or more storage drivers 116 that enable the VIC 110 to communicate with one or more different types of storage devices. The operating system on the host 120 comprises file systems 122, a SCSI layer 124, and a SCSI virtual network interface card (vNIC) 126. The host 120 communicates with storage 128 with a logical unit number (LUN) as a local storage accessed through the SCSI vNIC 126. Similarly, hosts 130, 140, and 150 include file systems 132, 142, and 152, SCSI layer 134, 144, and 154, and SCSI vNICs 136, 146, and 156 to communicate with storage devices 138, 148, and 158, respectively. Hereinafter, the terms SCSI vNIC and sNIC are used interchangeably to refer to the interface that a host uses to direct I/O requests to one or more storage devices.

Storage controller 160 controls storage drives 162 and 164, and provides access to the storage to the VIC 110 through the storage drivers 116. Similarly, storage controller 170 controls drives 172 and 174. In one example, one or more of the drives 162, 164, 172, and/or 174 may be a virtual drive defined by the storage controller 160 and/or storage controller 170. In another example, the storage drives may comprise a redundant array of independent disks (RAID) device. In a further example, the storage controller 160 and drives 162 and 164 may form one of a network attached storage (NAS) system, a direct attached storage (DAS) system, a Fibre Channel (FC) storage area network (SAN), an Internet SCSI (iSCSI) SAN, or a serial attached SCSI (SAS) system.

FIG. 1 shows system 100 with specific numbers of components (e.g., four hosts, two storage controllers, etc.), but other examples may include more or fewer hosts, storage controllers, storage drives, or logical drives. Additionally, eCPU firmware 112 may be run on multiple eCPU units concurrently. In one example, each host is assigned to a specific eCPU unit which runs eCPU firmware 112 to enable the host to access its respective storage drive.

Figure 2:
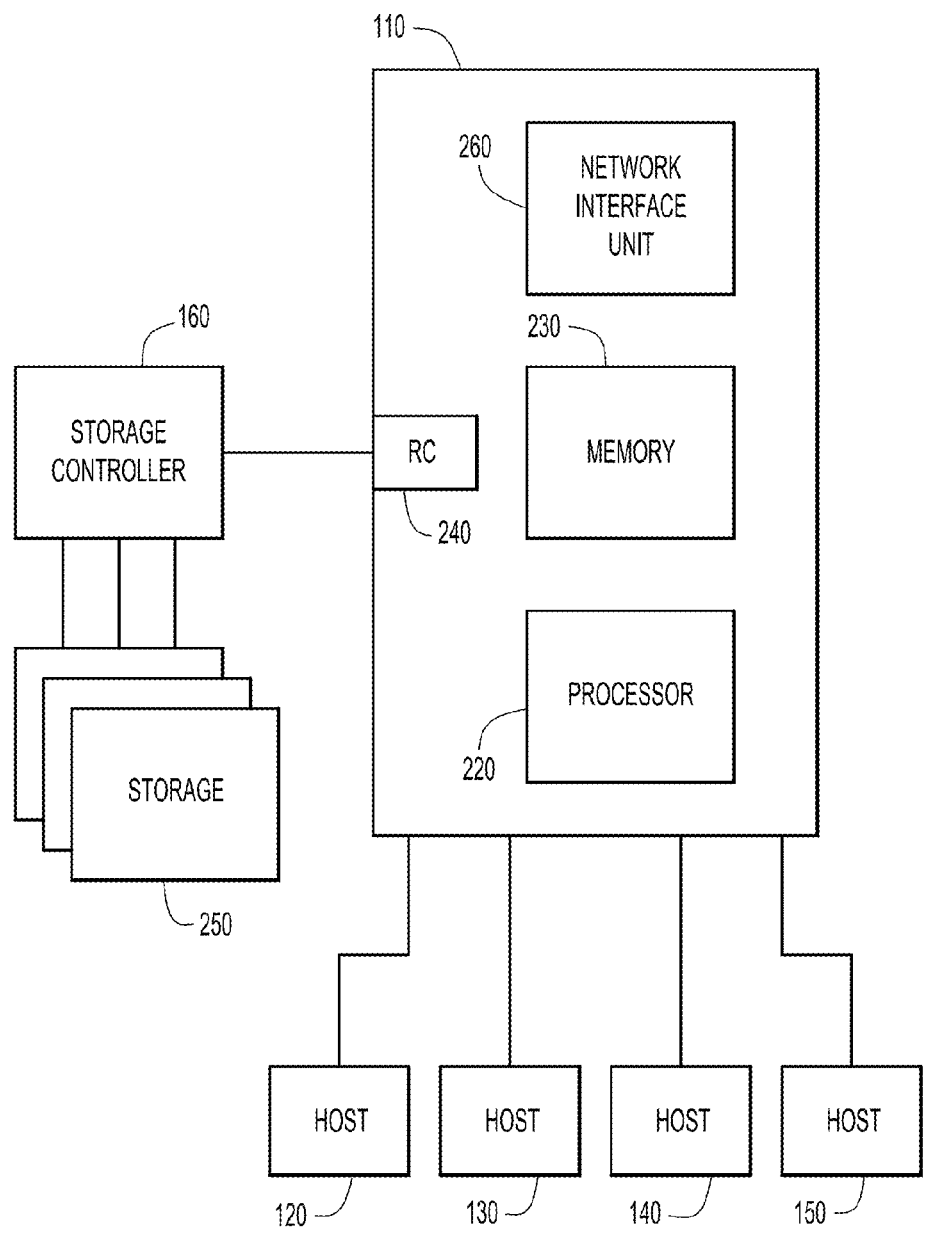
FIG. 2 is a block diagram of an adapter configured to provide a plurality of servers with local access to data storage according to an example embodiment.

Referring now to FIG. 2, a simplified block diagram shows the components used to implement system 100 according to one example embodiment. Hosts 120, 130, 140, and 150 are coupled to VIC 110, which includes, among other possible components, one or more processors 220 to process instructions relevant to enabling the servers to access the shared virtualized local storage, and a memory 230 to store a variety of data and software instructions (e.g., eCPU firmware 112, mCPU firmware 114, etc.). A PCIe Root Port Bridge 240 bridges traffic from a processor bus to a PCIe bus. In one example, PCIe Root Port Bridge 240 comprises Root Complex (RC) 240 that enables the VIC 110 to communicate with a storage controller 160 to access one or more disk drives 250. VIC 110 also includes a network interface unit 260 to enable network communication for all of the hosts 120, 130, 140, and 150.

Memory 230 may comprise read only memory (ROM), random access memory (RAM), magnetic disk storage media devices, optical storage media devices, flash memory devices, electrical, optical, or other physical/tangible (e.g., non-transitory) memory storage devices. The processor 220 is, for example, a microprocessor or microcontroller that executes instructions for implementing the processes described herein. Thus, in general, the memory 230 may comprise one or more tangible (non-transitory) computer readable storage media (e.g., a memory device) encoded with software comprising computer executable instructions and when the software is executed (by the processor 220) it is operable to perform the operations described herein.

Figure 3:
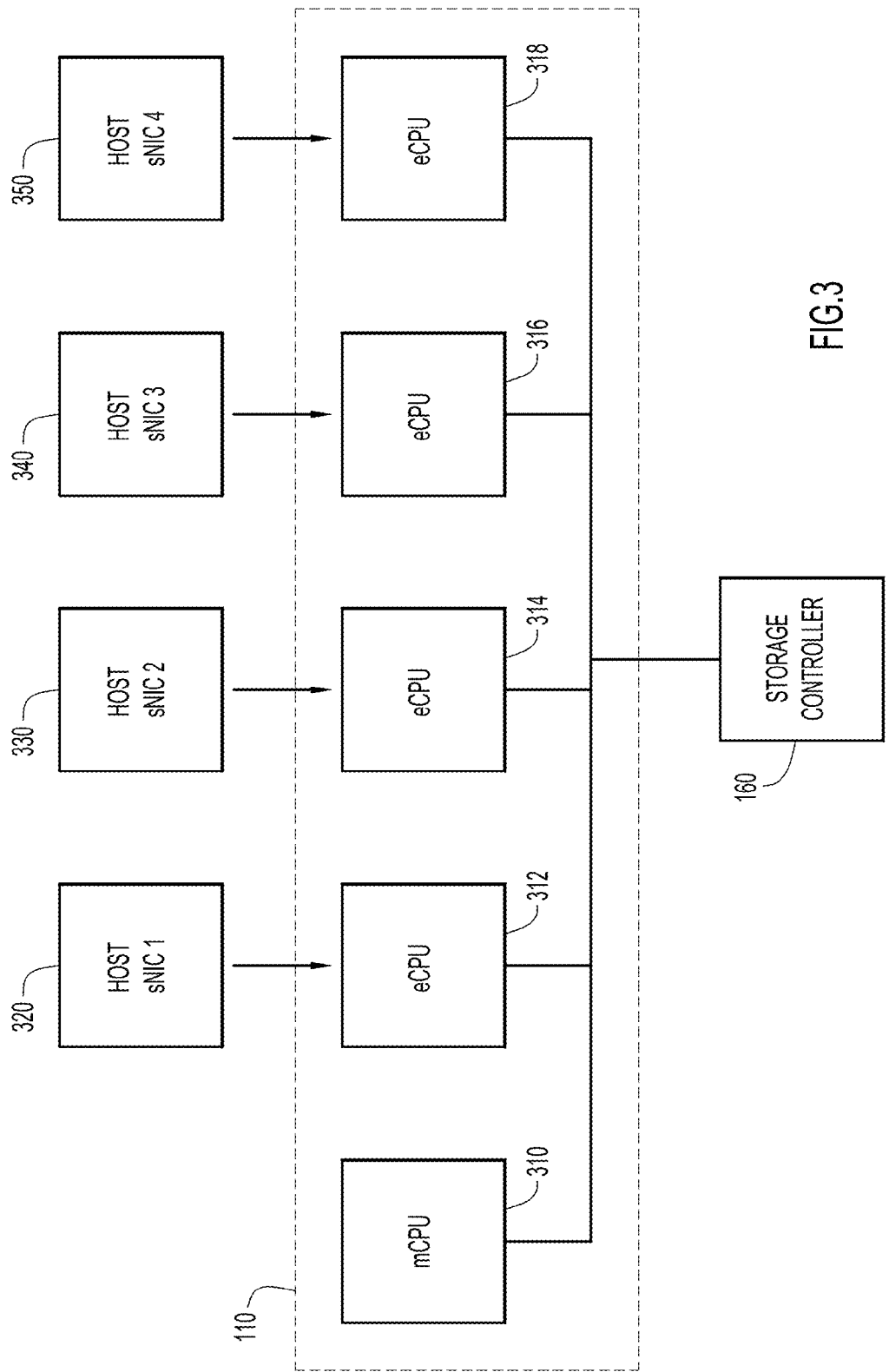
FIG. 3 is a simplified block diagram of the shared virtualized local storage system according to an example embodiment.

Referring now to FIG. 3, a simplified block diagram of the connections between hosts and the storage controller through specific eCPU units is shown. VIC 110 comprises mCPU 310, and eCPUs 312, 314, 316, and 318, each configured to process I/O requests from hosts 320, 330, 340, and 350. In one example, there is a one-to-one correspondence between hosts and eCPU units, but in other examples, more than one host may be assigned to an eCPU unit. Each host communicates with the VIC through an sNIC, which allows the host to use common SCSI drivers to issue I/O requests. Each eCPU and the mCPU can post message frame addresses to the request queue of storage controller 160 to pass along the I/O requests from the hosts.

In one example, all of the sNICs are tied to the mCPU running the storage driver. This option may be used to bring up the sNIC host drivers and/or to understand performance issues. In this example, a host requests an I/O operation by requesting parsing from the mCPU, which prepares a SCSI request for kernel asynchronous I/O. The mCPU sets up mapping for direct memory access (DMA) to the host I/O buffers (e.g., scatter gather elements (SGEs)), and executes the asynchronous I/O interface. The I/O operation completion path comprises completing the parsing, parsing the host response, unmapping the host DMA buffers, and posting the completion to the host.

In another example, the sNICs are distributed across all of the eCPUs, and each eCPU can post requests to the storage controller queue. In this example, the message frame space for the storage controller queue may be partitioned equally among the eCPUs that post I/O requests. The storage controller 160 may support multiple response queues, and the response queue may be specified on a per I/O basis. The I/O request path for each eCPU includes receiving a request from a host sNIC requesting parsing, preparing the storage controller message frame, and posting the message frame address to the storage controller request queue. In another example, the eCPU may not be able to post directly to the storage controller queue, and requires the mCPU to post the message frame address to the storage controller queue for the eCPU. When the storage controller completes an I/O request, it sends an interrupt to the mCPU, which is forwarded to the appropriate eCPU depending on a Message Signaled Interrupt (MSI) vector. This would avoid the mCPU from being forced to call an Interrupt Service Routine (ISR) to handle all of the interrupts for I/O completions. The I/O completion path for each eCPU comprises handling interrupts for I/O completions, completing the parsing, preparing a host response and posting the I/O completion to the host.

Figure 4:
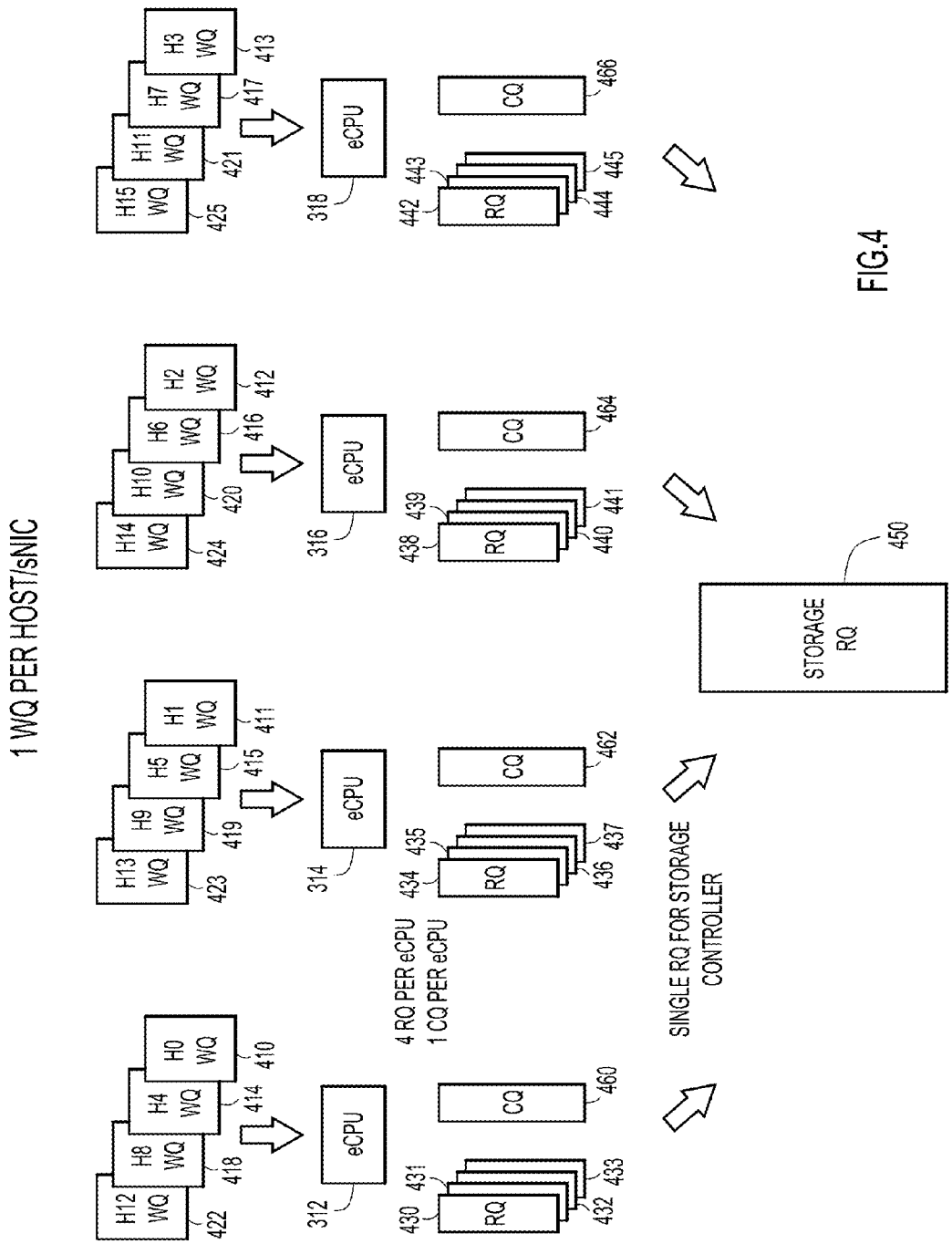
FIG. 4 is a block diagram of various data queues in the shared virtualized local storage system according to an example embodiment.

Referring now to FIG. 4, a block diagram of the queues involved in an I/O request is shown. Sixteen hosts (H0-H15) each have one of the write queues (WQ) 410-425 for use in I/O requests from that host/sNIC. There is one WQ associated with each sNIC, and one sNIC for each host. I/O requests from WQs 410, 414, 418, and 422 get sent to eCPU 312 where they are stored in request queues (RQs) 430, 431, 432, and 433, respectively. I/O requests from WQs 411, 415, 419, and 423 get sent to eCPU 314 where they are stored in RQs 434, 435, 436, and 437, respectively. I/O requests from WQs 412, 416, 420, and 424 get sent to eCPU 316 where they are stored in RQs 438, 439, 440, and 441, respectively. I/O requests from WQs 413, 417, 421, and 425 get sent to eCPU 318 where they are stored in RQs 442, 443, 444, and 445, respectively. In another example, each eCPU only maintains a single RQ for handling I/O requests from multiple sNICs. In this case, the eCPU will use a unique identifier for each sNIC, so that when an I/O operation completes, the eCPU can identify to which host CQ the I/O completion should be posted.

Each eCPU is able to post I/O requests to a combined storage controller RQ 450. In one example, the address space of the storage RQ 450 is divided equally amongst the four eCPUs 312, 314, 316, and 318. After the storage controller has completed the I/O request, it enters the completed I/O result into the completion queue (CQ) 460, 462, 464, or 466 belonging to the eCPU that entered the I/O request. The eCPU then returns the completed I/O request to the appropriate host in a host CQ (not shown).

In one example, the storage controller supports a maximum of 1024 Request Message Frames (MFs). The 1024 MFs will be divided equally amongst the four eCPUs. The MFs may be posted out of order, however the storage controller may require that the memory for all 1024 MFs be physically contiguous. While initializing the eCPUs, the mCPU may allocate the contiguous block of memory and distribute the chunks to all four eCPUs. This enables the eCPUs to post I/O requests without the mCPU intervening. The completion interrupts after the storage controller completes an I/O request are also distributed to the respective eCPU that posted the I/O request. The eCPUs can post I/O requests directly to the storage RQ 450 using atomic multiword write transactions. Since these are atomic operations, there is no synchronization required across the eCPUs.

Figure 5:
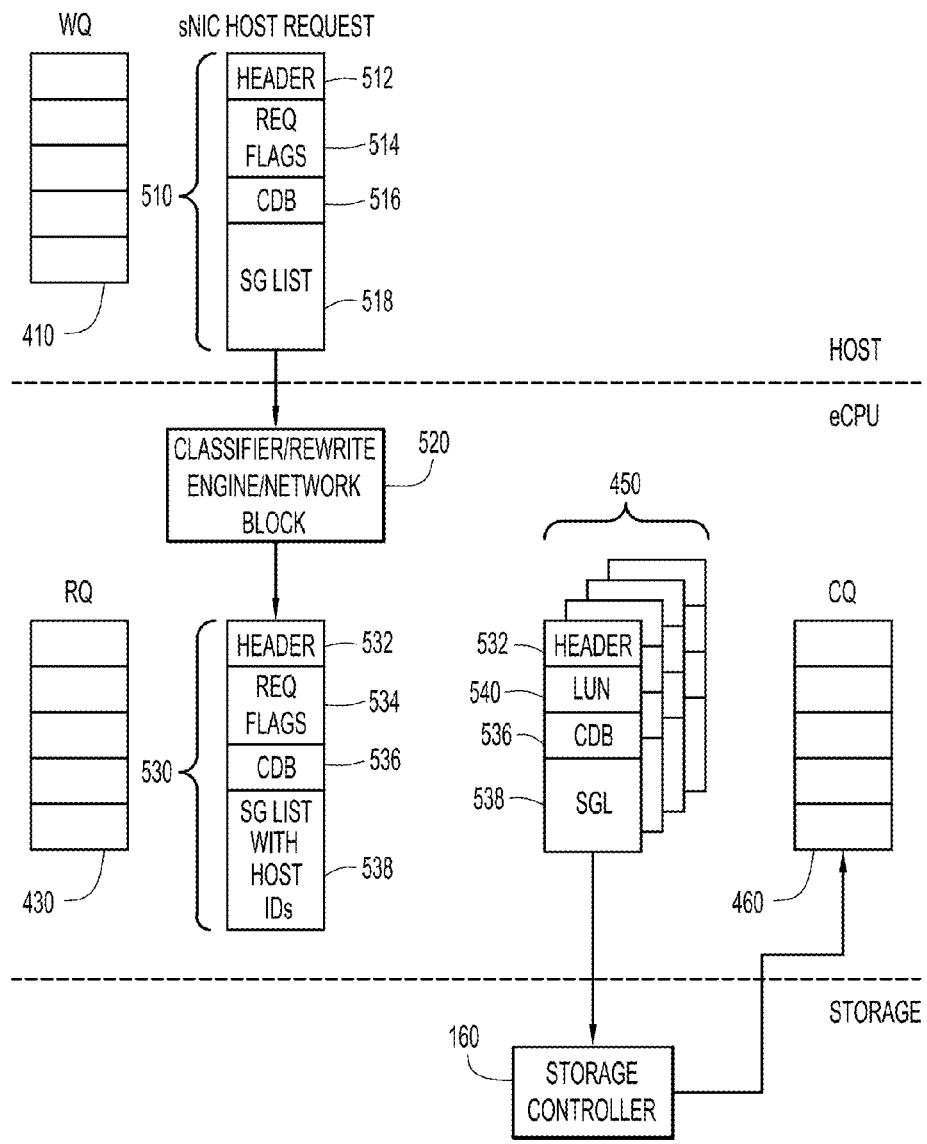
FIG. 5 is a block diagram of an Input/Output (I/O) request passing from a host to the storage controller though the adapter according to an example embodiment.

Referring now to FIG. 5, a block diagram of a single I/O request is shown. An I/O request 510 in WQ 410 comprises a header 512, any required flags 514, Command Descriptor Block (CDB) 516, and Scatter Gather List (SGL) 518. On entering the eCPUs RQ 430, I/O request 510 is processed by a Classifier/Rewrite Engine/Network Block 520 to become I/O request 530. I/O request 530 comprises a header 532, any required flags 534, CDB 536, and an SGL 538 with the host identifiers embedded in the scatter gather elements (SGEs). In posting the I/O request to the storage RQ 450, the eCPU adds the LUN identifier 540, per the LUN masking information for the appropriate sNIC/host. On completion of the I/O request, the storage controller 160 returns the result to CQ 460 in the eCPU, and the eCPU steers the I/O completion to the appropriate host.

In one example, the I/O request transformation step performed by rewrite engine 520 modifies the last four bits of the host address in the SGL to have the host identifier. This allows direct memory access (DMA) to/from the host memory. Additionally, the I/O request transformation step may buffer an address for sense data as well, so that the storage controller can DMA the sense data to the host memory without the eCPU intervening. Further the I/O request transformation step may modify the LUN identifier as per the LUN masking information for a given sNIC. In one example, the I/O request transformation step is be performed by a software module on the eCPU. In another example, a custom hardware block may be used to perform the I/O request transformation step.

In another example, the eCPU may include a predetermined number of the SGEs embedded in the SGL 538, and any further SGEs are entered into an extended SGL buffer array separate from the storage RQ 450.

Figure 6:
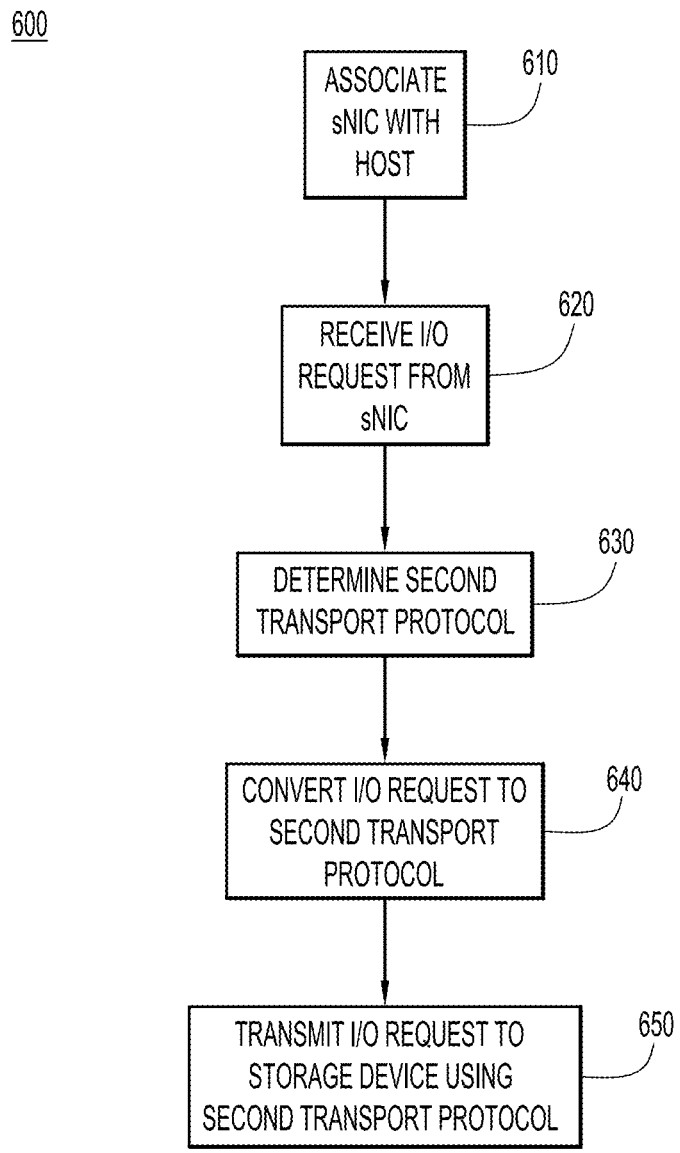
FIG. 6 is a flowchart depicting operations of an adapter providing virtualized local storage for a host according to an example embodiment.

Referring now to FIG. 6, an example process 600 of operations performed by an eCPU in processing an I/O request is shown. In step 610, the eCPU associates an sNIC with a host, which will use a first transport protocol. The eCPU receives an I/O request directed to a storage device from the host using the sNIC in step 620. In step 630, the eCPU determines a second transport protocol used by the storage device. The eCPU converts the I/O request to the second transport protocol in step 640, and transmits the I/O request to the storage device using the second protocol in step 650.

In summary, the techniques presented herein provide for presenting shared local storage to each of a plurality of servers through a virtual SCSI controller. A portion of the shared storage appears to each server as a private local drive directly attached to the server. The server manages the storage using well-known SCSI direct-attached-storage methods. The per-server cost is greatly reduced compared to traditional local storage controller options, while preserving many of the advantages of local storage drives. Further, this allows complex and/or expensive storage systems (e.g., solid state drives, RAID devices) to be used by several servers, reducing the per-server storage requirements. A server administrator manages virtualized local storage using a familiar model and is not required to configure or manage network storage. This allows insertion of storage services typically associated with high-end network storage (e.g., RAID, read-only, copy-on-write, de-duplication, snapshots, backups, etc.) on the virtualized local storage without server involvement.

In one example, the techniques presented herein provide for a method for an eCPU to process an I/O request from a host using a virtual storage controller. The eCPU associates a first virtual storage controller with a first host. The first virtual storage controller uses a first transport protocol. The eCPU receives a first I/O request directed at a storage device from the first virtual storage controller using the first network transport protocol. The eCPU determines a second transport protocol used by the storage device, and converts the first I/O request from a format according to the first transport protocol to a format according to the second transport protocol. The eCPU transmits the first I/O request to the storage device using the second transport protocol.

In another example, an apparatus is provided comprising one or more virtual storage controllers associated with one or more hosts. The virtual storage controllers use a first transport protocol. The apparatus also comprises one or more storage drivers to communicate with one or more storage devices and one or more processors. The processors receive a first I/O request directed at a first storage device from a first virtual storage controller. The processors determine a second transport protocol used by the storage drivers to communicate with the first storage device. The processors convert the first I/O request from a format according to the first transport protocol to a format according to the second transport protocol, and transmit the first I/O request to the first storage device using the second transport protocol via the storage drivers.

In a further example, a system is provided comprising one or more host devices, one or more storage devices, and a virtual interface card. The virtual interface card associates a first virtual storage controller with a first host. The first virtual storage controller uses a first transport protocol. The virtual interface card receives a first I/O request directed at a first storage device from the first virtual storage controller using the first transport protocol. The virtual interface card determines a second transport protocol used by the first storage device, and converts the first I/O request from a format according to the first transport protocol to a format according to the second transport protocol. The virtual interface card transmits the first I/O request to the first storage device using the second transport protocol.

The above description is intended by way of example only. Various modifications and structural changes may be made therein without departing from the scope of the concepts described herein and within the scope and range of equivalents of the claims.

What is claimed is:

1. A method comprising:
    associating a first virtual storage controller with a first host, wherein the first virtual storage controller uses a first transport protocol;
    receiving a first input/output (I/O) request from the first virtual storage controller using the first transport protocol, the first I/O request directed at a storage device;
    determining a second transport protocol used by the storage device;
    converting the first I/O request from a format according to the first transport protocol to a format according to the second transport protocol;
    storing the first I/O request from the first virtual storage controller in a request queue;
    receiving a second I/O request from a second virtual storage controller associated with a second host;
    converting the second I/O request from the format according to the first transport protocol to the format according to the second transport protocol;
    storing the second I/O request from the second virtual storage controller in the request queue; and
    transmitting the first I/O request and the second I/O request from the request queue to the storage device.

2. The method of claim 1, further comprising:
    receiving a first I/O result from the storage device in accordance with the second transport protocol;
    converting the first I/O result from a format according to the second transport protocol to a format according to the first transport protocol; and
    transmitting the first I/O result to the first host via the first virtual storage controller using the first transport protocol.

3. The method of claim 1, wherein the first transport protocol is a Small Computer System Interface (SCSI) protocol.

4. The method of claim 3, wherein the storage device is accessed through the second transport protocol by one of Fibre Channel protocol, or the SCSI over Internet Protocol (iSCSI).

5. The method of claim 3, wherein the storage device is one of a direct-attached storage (DAS) device or a network-attached storage (NAS) device.

6. The method of claim 3, wherein the storage device comprises a Redundant Array of Independent Devices (RAID).

7. The method of claim 1, further comprising:
receiving a second I/O result for the second I/O request;
storing the second I/O result in a result queue;
converting the second I/O result from a format according the second transport protocol to a format according to the first transport protocol; and
transmitting the second I/O result to the second host via the second virtual storage controller using the first transport protocol.

8. The method of claim 1, further comprising:
receiving a third I/O request from the first virtual storage controller, the third I/O request directed at a second storage device;
determining a third transport protocol used by the second storage device;
converting the third I/O request to a format according to the third transport protocol; and
transmitting the third I/O request to the second storage device using the third transport protocol.

9. An apparatus comprising:
one or more virtual storage controllers associated with one or more hosts, the one or more virtual storage controllers using a first transport protocol;
one or more storage drivers to communicate with one or more storage devices;
one or more processors to:
receive a first input/output (I/O) request from a first virtual storage controller among the one or more virtual storage controllers, the first I/O request directed at a first storage device among the one or more storage devices;
determine a second transport protocol used by the one or more storage drivers to communicate with the first storage device;
convert the first I/O request from a format according to the first transport protocol to a format according to the second transport protocol; and
store the first I/O request from the first virtual storage controller in a request queue;
receive a second I/O request from a second virtual storage controller associated with a second host;
convert the second I/O request from the format according to the first transport protocol to the format according to the second transport protocol;
store the second I/O request from the second virtual storage controller in the request queue; and
transmit the first I/O request and the second I/O request from the request queue to the storage device.

10. The apparatus of claim 9, wherein the processor further:
receives a first I/O result from the first storage device in accordance with the second transport protocol via the one or more storage drivers;
converts the first I/O result from a format according to the second transport protocol to a format according to the first transport protocol; and
transmits the first I/O result to the first host via the first virtual storage controller using the first transport protocol.

11. The apparatus of claim 9, wherein the first transport protocol is a Small Computer System Interface (SCSI) protocol.

12. The apparatus of claim 11, wherein the first storage device is accessed through the second transport protocol by one of Fibre Channel protocol, or the SCSI over Internet Protocol (iSCSI).

13. The apparatus of claim 11, wherein the first storage device is one of a direct-attached storage (DAS) device or a network-attached storage (NAS) device.

14. The apparatus of claim 11, wherein the first storage device comprises a Redundant Array of Independent Devices (RAID).

15. The apparatus of claim 10, wherein the processor further:
receives a second I/O result for the second I/O request;
stores the second I/O result in a result queue;
converts the second I/O result from a format according the second transport protocol to a format according to the first transport protocol; and
transmits the second I/O result to the second host via the second virtual storage controller using the first transport protocol.

16. The apparatus of claim 9, wherein the processor further:
receives a third I/O request from the first virtual storage controller, the third I/O request directed at a second storage device;
determines a third transport protocol used by the second storage device;
converts the third I/O request to a format according to the third transport protocol; and
transmits the third I/O request to the second storage device using the third transport protocol.

17. A system comprising:
one or more host devices;
one or more storage devices; and
a virtual interface card to:
associate a first virtual storage controller with a first host among the one or more hosts, wherein the first virtual storage controller uses a first transport protocol;
receive a first input/output (I/O) request from the first virtual storage controller using the first transport protocol, the first I/O request directed at a first storage device among the one or more storage devices;
determine a second transport protocol used by the first storage device;
convert the first I/O request from a format according to the first transport protocol to a format according to the second transport protocol; and
store the first I/O request from the first virtual storage controller in a request queue;
receive a second I/O request from a second virtual storage controller associated with a second host;
convert the second I/O request from the format according to the first transport protocol to the format according to the second transport protocol;
store the second I/O request from the second virtual storage controller in the request queue; and
transmit the first I/O request and the second I/O request from the request queue to the storage device.

18. The system of claim 17, wherein the virtual interface card further:
receives a first I/O result from the first storage device in accordance with the second transport protocol;
converts the first I/O result from a format according to the second transport protocol to a format according to the first transport protocol; and transmits the first I/O result to the first host via the first virtual storage controller using the first transport protocol.

19. The system of claim 17, wherein the first transport protocol is a Small Computer System Interface (SCSI) protocol.

20. The system of claim 19, wherein the first storage device is accessed through the second transport protocol by one of Fibre Channel protocol, or the SCSI over Internet Protocol (iSCSI).

21. The system of claim 19, wherein the first storage device is one of a direct-attached storage (DAS) device or a network-attached storage (NAS) device.

22. The system of claim 19, wherein the first storage device comprises a Redundant Array of Independent Devices (RAID).

23. The system of claim 17, wherein the virtual interface card further:
receives a second I/O result for the second I/O request;
stores the second I/O result in a result queue;
converts the second I/O result from a format according the second transport protocol to a format according to the first transport protocol; and
transmits the second I/O result to the second host via the second virtual storage controller using the first transport protocol.

24. The system of claim 17, wherein the virtual interface card further:
receives a third I/O request from the first virtual storage controller, the third I/O request directed at a second storage device;
determines a third transport protocol used by the second storage device;
converts the third I/O request to a format according to the third transport protocol; and
transmits the third I/O request to the second storage device using the third transport protocol.

* * * * *